United States Patent
Leung

(10) Patent No.: US 6,321,148 B1
(45) Date of Patent: *Nov. 20, 2001

(54) VEHICLE COMMUNICATION CONTROL APPARATUS AND METHOD

(75) Inventor: Sherman Leung, Montclair, CA (US)

(73) Assignee: Toyota Jidosha Kabushiki Kaisha, Toyota (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/048,618

(22) Filed: Mar. 26, 1998

(30) Foreign Application Priority Data

Mar. 31, 1997 (JP) ..................................... 9-079738

(51) Int. Cl.[7] .............................. G06F 7/00; G01M 17/00

(52) U.S. Cl. ................................ 701/29; 701/33; 701/34; 370/241; 370/242; 370/471; 714/1; 714/25; 714/736; 340/825.06

(58) Field of Search .................................. 701/29, 30, 33, 701/34, 35, 31, 32, 114, 115; 340/825.06, 825.08, 825.16, 825.1, 825.5, 825.51; 375/259, 220; 73/117.3, 118.1; 123/339.1, 361; 370/216, 221, 225, 241, 242, 243, 248, 249, 252, 464, 471; 714/1, 25, 724, 736, 746–749

(56) References Cited

U.S. PATENT DOCUMENTS

| | | | |
|---|---|---|---|
| 4,398,297 | * 8/1983 | Hwang et al. | 379/28 |
| 4,534,025 | 8/1985 | Floyd | 370/449 |
| 4,884,059 | * 11/1989 | Shapiro | 340/514 |
| 5,034,889 | 7/1991 | Abe | 701/35 |
| 5,077,670 | * 12/1991 | Takai et al. | 701/33 |
| 5,132,905 | * 7/1992 | Takai et al. | 701/33 |
| 5,200,745 | * 4/1993 | Takai et al. | 340/825.65 |
| 5,479,347 | * 12/1995 | Oguro et al. | 701/33 |
| 5,481,906 | * 1/1996 | Nagayoshi et al. | 701/33 |
| 5,565,856 | * 10/1996 | Takaba et al. | 701/29 |
| 5,586,034 | * 12/1996 | Takaba et al. | 701/29 |
| 5,757,645 | * 5/1998 | Schneider et al. | 701/29 |

(List continued on next page.)

FOREIGN PATENT DOCUMENTS

| | | |
|---|---|---|
| 195 41 637 A1 | 5/1996 | (DE) . |
| 0 755 829 A2 | 1/1997 | (EP) . |
| 0 793 084 A2 | 9/1997 | (EP) . |
| 2-73130 | 3/1990 | (JP) . |
| 8-223188 | 8/1996 | (JP) . |
| 8-223190 | 8/1996 | (JP) . |

OTHER PUBLICATIONS

International Organization for Standardization, "Road vehicles—Diagnostic systems—Keyword protocol 2000—Part 3: Implementation," *Draft International Standard*, ISO/DIS 14230-3, 1995, pp. 1–97.

SAE, "Enhanced E/E Diagnostic Test Modes," *SAE Recommended Practice J2190*, ISO/TC22/SC3/GT1/TF1 N 88, Jun. 18, 1993, pp. 1–62.

*Primary Examiner*—Jacques H. Louis-Jacques
(74) *Attorney, Agent, or Firm*—Oliff & Berridge, PLC

(57) ABSTRACT

A communication control apparatus and method for controlling communication between a plurality of electronic control units (ECUs) provided in a vehicle and a diagnostic apparatus. Each of the ECUs determines whether it is ready to send a positive response to the diagnostic apparatus within a predetermined response time after receiving a request signal from the diagnostic apparatus. A negative response signal is sent to the diagnostic apparatus by any ECU that is not ready. The negative response signal indicates that the sending ECU is not ready and allows the other ECUs to respond to the diagnostic apparatus. The diagnostic apparatus sends a further request signal directed specifically to an ECU that send a negative response signal.

8 Claims, 6 Drawing Sheets

U.S. PATENT DOCUMENTS 5,771,474 * 6/1998 Matt et al. .............................. 701/29
5,841,983 * 11/1998 Takaba et al. .................. 395/200.55
5,890,080 * 3/1999 Coverdill et al. ...................... 701/33
5,896,418 * 4/1999 Hamano et al. ....................... 701/33
5,948,025 * 9/1999 Sonoda .................................. 701/29
5,978,352 * 11/1999 Imaizumi et al. .................... 370/216

* cited by examiner

VEHICLE COMMUNICATION CONTROL APPARATUS AND METHOD

BACKGROUND OF THE INVENTION

The present invention relates to a vehicle communication control apparatus that controls communication between on-vehicle electronic control units and a diagnostic apparatus that reads the diagnostic data stored in the electronic control units. More particularly, the present invention pertains to a communication control apparatus for a vehicle provided with electronic control units connected to one another by a communication network.

Electronic control has become widely used in vehicles such as automobiles. There are various electronic control units (hereafter referred to as ECU) used in an automobile. For example, there is an ECU used for controlling the fuel injection, an ECU used for controlling the transmission and an ECU used for controlling the anti-lock brake system. Each ECU sends a command signal to the corresponding device and controls the device in an optimum manner. A self-diagnosing function is provided for each ECU. When an abnormality is detected while controlling the corresponding device, diagnostic data indicating such abnormality is stored in the ECU.

Accordingly, when there is a malfunction in an automobile, the malfunction may be identified by connecting an external vehicle diagnostic apparatus to a communication port provided in each ECU. The diagnostic apparatus is used to determine whether each ECU is functioning normally when the assembled automobile leaves the factory.

However, the number of ECUs used in automobiles is increasing in accordance with the rapid progress in electronic control. This has complicated the diagnosis of ECUs.

To simplify the diagnosis, the ECUs may be connected to one another with a data bus to form a communication network. This enables intercommunication among the ECUs. Thus, the data stored in each ECU may be used by other ECUs. This allows further progress in vehicle control technology.

Japanese Unexamined Patent Publication No.2-73130 describes a communication network that interconnects ECUs so that an external vehicle diagnostic apparatus may read the diagnostic data stored in each ECU through the network. A communication connector of the diagnostic apparatus is connected to a communication port provided on the network. This facilitates the reading of the diagnostic data stored in each ECU.

Vehicle diagnostic systems have a set of standards specified by the International Standardization Organization (ISO). Accordingly, it is preferable that vehicle diagnostic systems be constructed in accordance with the associated ISO standard. However, a vehicle diagnostic system according to the ISO standard raises the following problem, which is described in reference to FIGS. 5 and 6.

FIG. 5 is a flowchart showing an example of communication procedures ("one of Plural N" communication) based on a prior art system. FIG. 6 is a timing chart showing communication timing among an external vehicle diagnostic apparatus, an ECU 50 and another ECU 51.

The ECUs 50, 51 are connected to each other by a communication cable, and the ECUs 50, 51 communicate with each other. According to ISO14230 and J2190 by the Society of Automotive Engineers (SAE), the ECUs 50, 51 are expected to positively respond to a request signal sent by the diagnostic apparatus or the other ECU within a predetermined time period. ISO14230 and SAE J2190 recommend also that the ECUs 50, 51 send negative response signals when unable to respond within the predetermined time period.

The flowchart of FIG. 5 describes a program executed by each ECU 50, 51. Referring to FIG. 5, each ECU receives a request signal sent by the diagnostic apparatus at Step 101.

At Step 102, each ECU judges whether a predetermined idle time P2 has elapsed after receiving the request signal (0 msec<P2<50 msec). Suppose the idle time P2 for the ECU 50 is 24 msec, and the idle time P2 for the ECU 51 is 32 msec. If the judgment at Step 102 is NO, each ECU waits until the idle time P2 has elapsed. If the judgment at Step 102 is YES, which means the idle time P2 has elapsed, each ECU judges whether it is ready to send a positive response signal to the diagnostic apparatus at Step 103.

At Step 104, the ECU sends a negative response signal to the diagnostic apparatus when not ready to send a response signal to the diagnostic apparatus.

When ready, the ECU sends the positive response signal to the diagnostic apparatus at Step 105. At Step 106, the ECU judges whether the other ECU is in communication with the diagnostic apparatus. If so, the ECU goes on to Step 102 and if not, goes on to Step 101.

When, for example, the ECU 50 cannot send a positive response signal when the idle time P2 has elapsed after receiving a request signal from the diagnostic apparatus, the ECU 50 sends a negative response signal to the diagnostic apparatus. As FIG. 6 shows, the ECU 50 keeps sending the negative response signal until it can send a positive response signal. The other ECU 51 is forbidden to respond while the ECU 50 is sending the negative response signal. Because of this, the other ECU 51 may not be able to reply to the diagnostic apparatus for a long time until the ECU is ready to send a positive response signal. This prevents smooth communication among the ECUs 50, 51 and the diagnostic apparatus.

SUMMARY OF THE INVENTION

Accordingly, it is an objective of the invention to provide a vehicle communication control apparatus that solves the problem caused when one ECU cannot respond within a predetermined response time.

To achieve the above objective, the present invention provides a communication control apparatus for controlling communication between a plurality of electronic control units provided in a vehicle and a diagnostic device. The diagnostic device diagnoses each of a set of electronic control units. A determiner in each control unit determines whether a positive response can be issued to the diagnostic device within a predetermined response time after receiving a request signal from the diagnostic device. A transmitter in each control unit of the set transmits a negative response signal to the diagnostic device when the determiner determines that a positive response to the diagnostic device cannot be issued. The negative response signal allows another control unit of the set to respond to the diagnostic device.

Also, the present invention provides a method for controlling communication between a set of electronic control units provided in a vehicle and a diagnostic device. The method comprises: determining whether each control unit is able to respond positively to the diagnostic device within a predetermined response time after receiving a request signal from the diagnostic device; and transmitting a negative response signal to the diagnostic device from each control unit of the set that is not ready to positively respond to the diagnostic device. The negative response signal allows another control unit of the set to respond to the diagnostic device.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings.

DETAILED DESCRIPTION OF THE PREFERRED EMBODIMENTS

A vehicle communication control apparatus according to the present invention will now be described referring to FIGS. 1 to 4.

Figure 1:
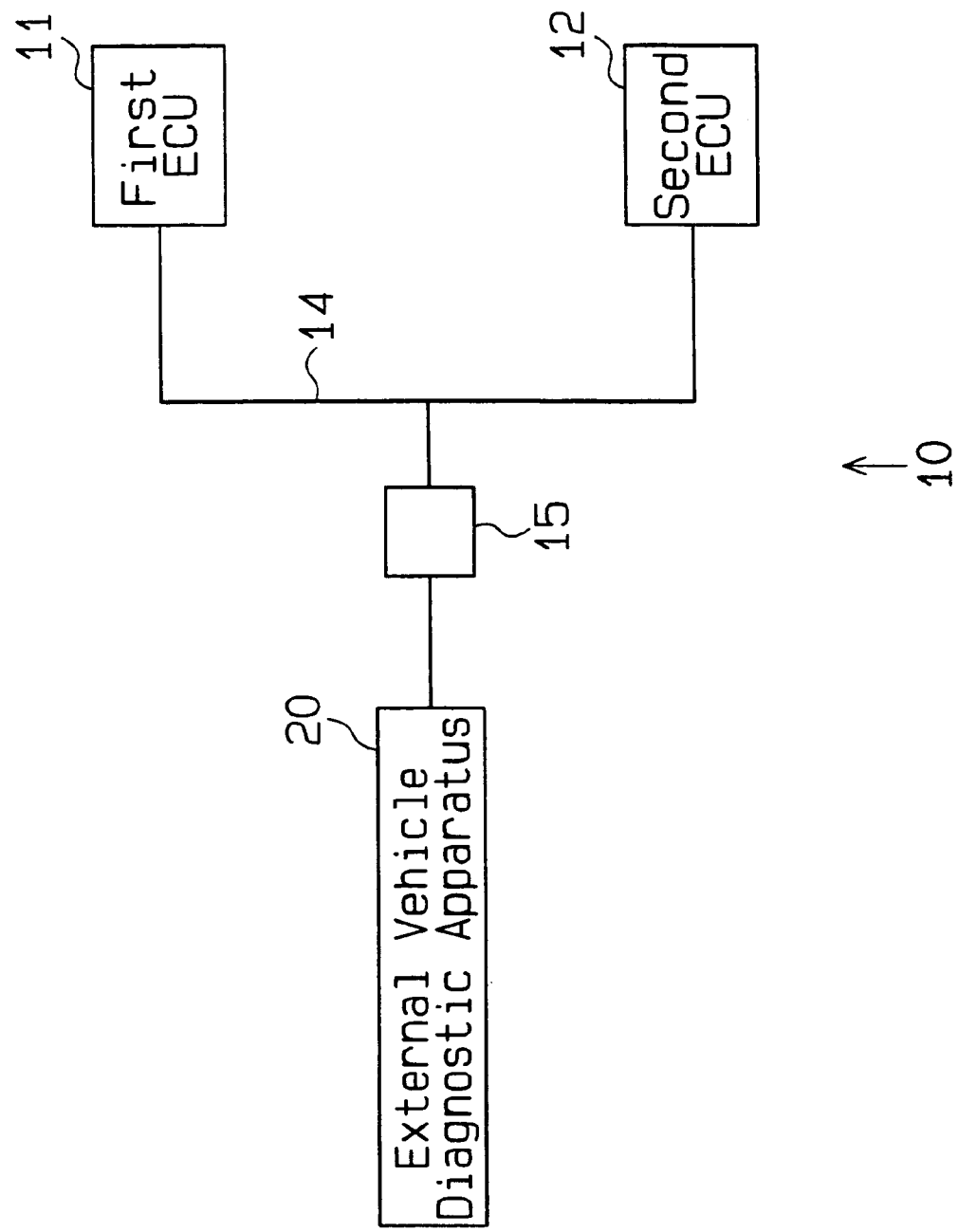
FIG. 1 shows a schematic system diagram of a vehicle communication control apparatus in one embodiment according to the present invention.
Figure 2:
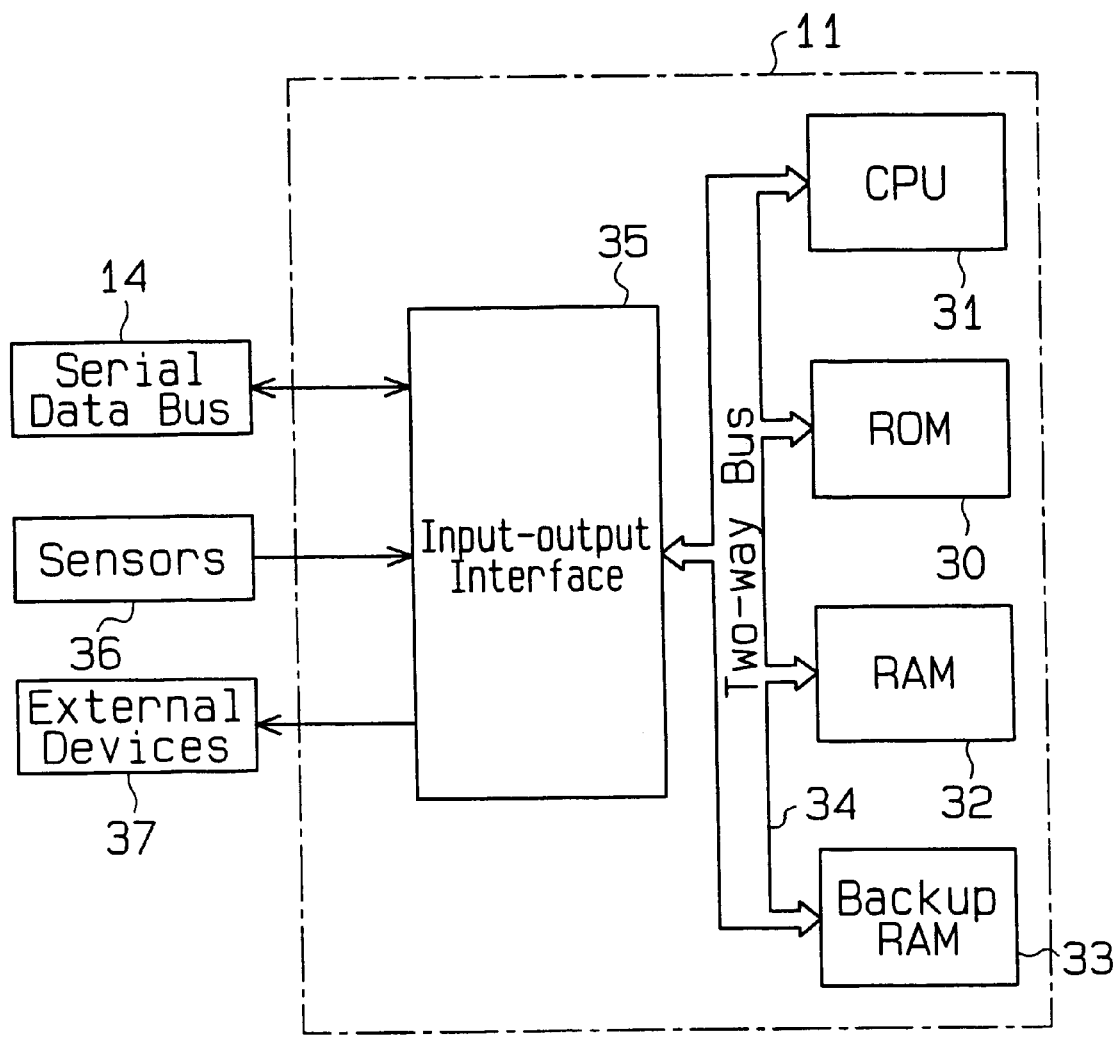
FIG. 2 is a block diagram showing a schematic configuration of a first ECU.

The structure of a vehicle communication control apparatus 10 according to the present invention will first be described referring to FIGS. 1 and 2. FIG. 1 is a system diagram showing the schematic structure of the communication control apparatus 10. FIG. 2 is a block diagram showing a schematic electrical structure of a first electronic control unit (ECU) 11.

As FIG. 1 shows, the first ECU 11 and a second ECU 12 are connected by a serial data bus 14 and form a local area network (LAN). A standard connector 15 is provided on the serial data bus 14 for connection to an external vehicle diagnostic apparatus 20.

Each ECU 11, 12 is connected to various external devices 37 (Refer to FIG. 2), and each has a self-diagnosing function to detect the state of the external devices 37 and to memorize the detection results as diagnostic data.

The first ECU 11 functions as a master ECU to control communication on the serial data bus 14 when communication happens between the ECUs 11 and 12. The ECU 11 functions also as a slave ECU after the diagnostic apparatus 20 is connected to the connector 15 and initialized. The second ECU 12 always functions as a slave ECU.

The diagnostic apparatus 20 is connected to the serial data bus 14 by way of the connector 15 to read diagnostic data stored in each ECU 11, 12 and to perform trouble-shooting based on the data. Prior to the trouble-shooting, the diagnostic apparatus 20 initializes the serial data bus 14 and each ECU 11, 12 by sending an initialization signal to the serial data bus 14. Furthermore, the diagnostic apparatus 20 always functions as a master ECU to control signals on the serial data bus 14.

The configuration of the first ECU 11 will now be described in reference to FIG. 2, which represents both ECUs.

The first ECU 11 has a ROM 30 that stores various programs. The programs are used to control signals on the serial data bus 14 and to determine things such as a fuel injection timing and ignition timing based on vehicle conditions detected by various sensors. The ECU 11 also has a CPU 31, a RAM 32 and a backup RAM 33. The CPU 31 does calculations based on the programs stored in the ROM 30. The RAM 32 temporarily memorizes the results calculated by the CPU 31 and the data input by the sensors. The backup RAM 33 stores data that should be saved when the engine (not shown) stops.

The CPU 31, ROM 30, RAM 32 and the backup RAM 33 are connected together by way of a two-way bus, which is connected to an input-output interface 35.

The input-output interface 35 is connected to various sensors 36. The interface 35 may include an analog-digital converter (not shown). If analog signals are sent by the sensors 36, the analog-digital converter converts the signals into digital signals, and the digital signals are sent to the two-way bus 34.

The input-output interface 35 is also connected to the external devices 37 such as a fuel injector and an ignitor. The external devices 37 are controlled based on the calculation results of the programs executed by the CPU 31.

Figure 3:
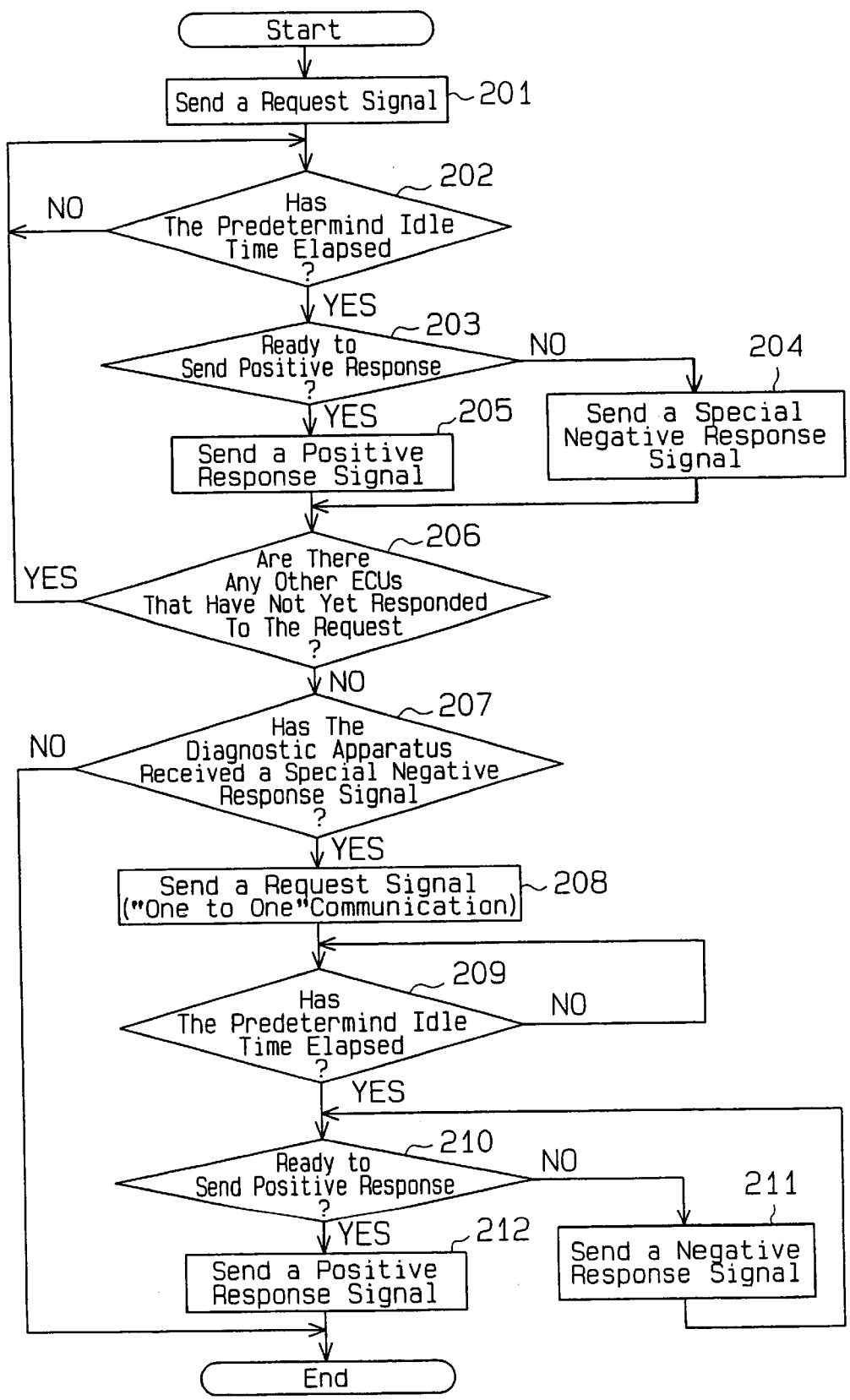
FIG. 3 is a flowchart showing an example of communication control procedures.
Figure 4:
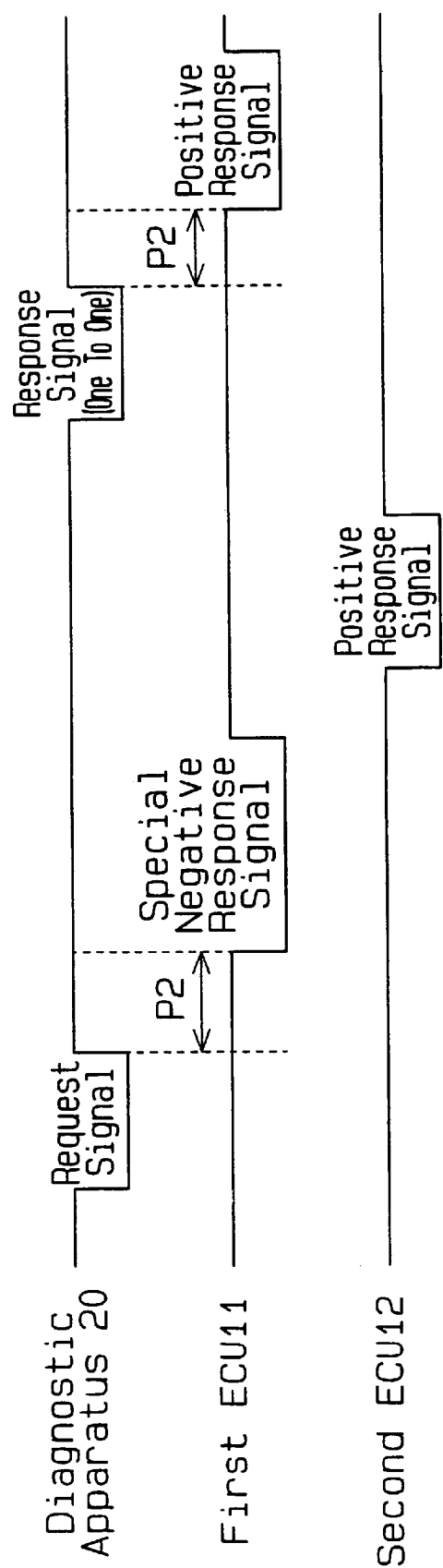
FIG. 4 is a timing chart showing the communication timing of an external vehicle diagnostic apparatus, the first ECU and a second ECU.
Figure 5:
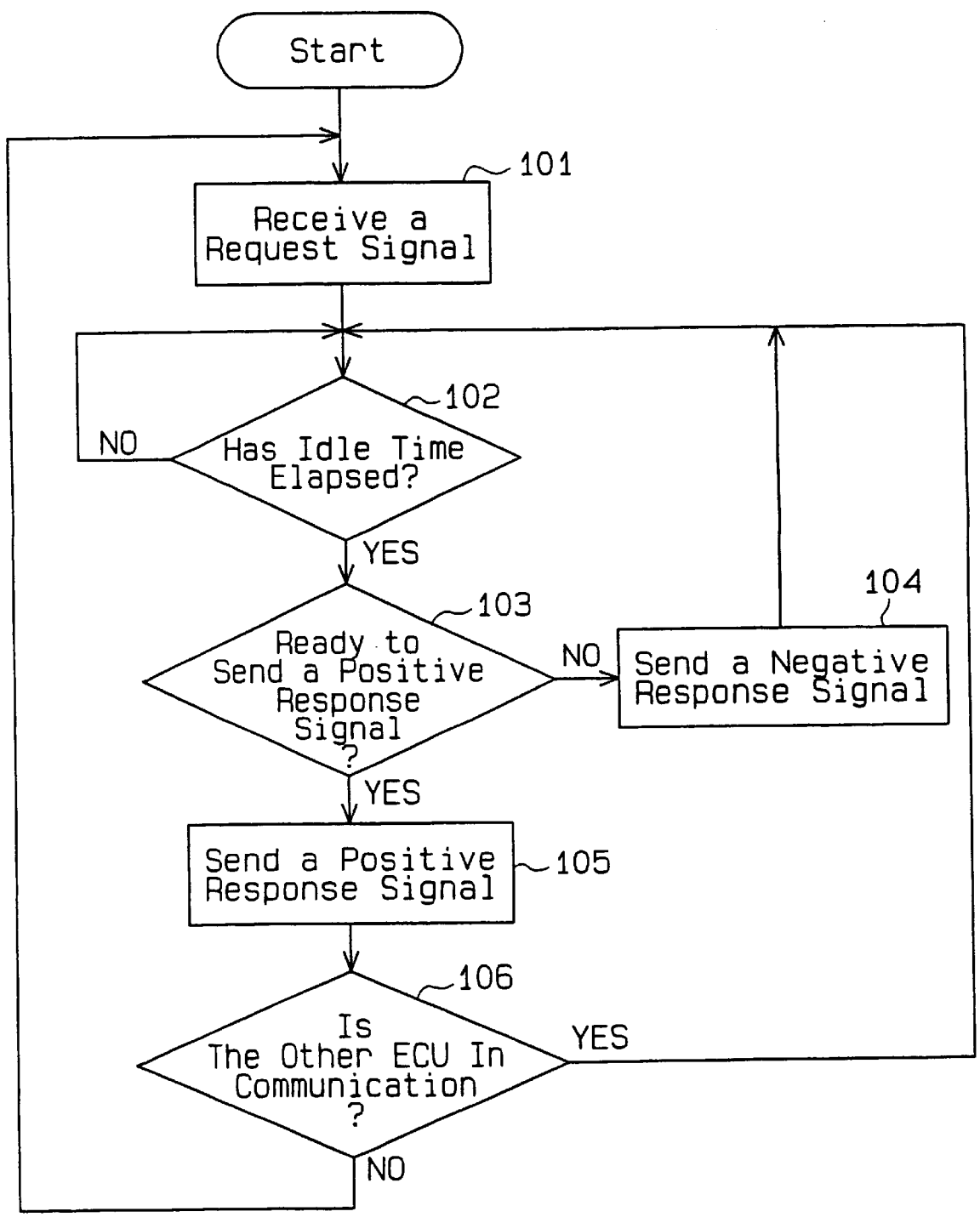
FIG. 5 is a flowchart showing communication control procedures executed by a prior art communication control apparatus.
Figure 6:
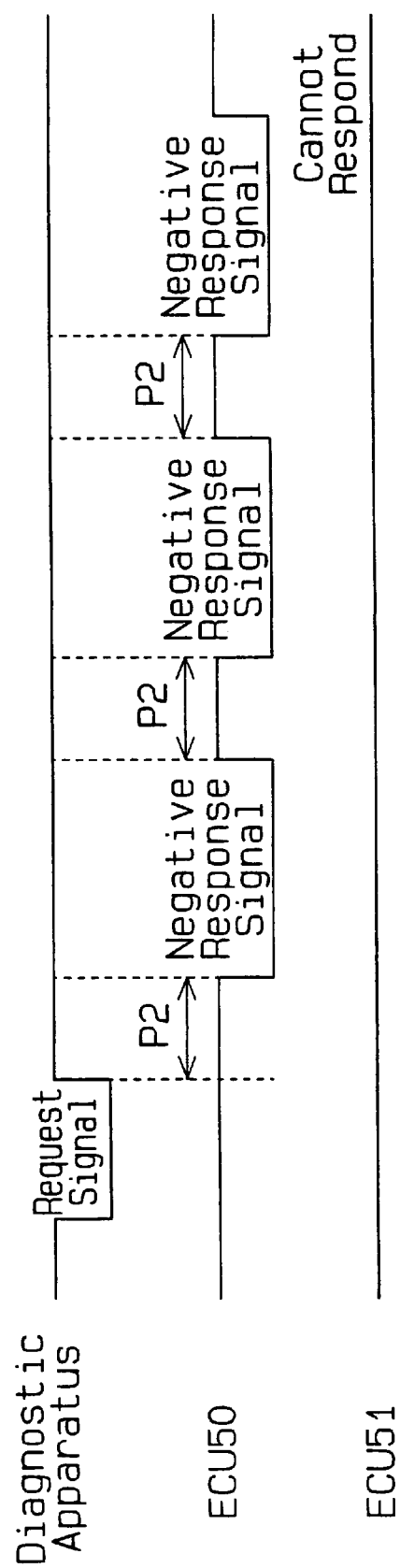
FIG. 6 is a timing chart showing the communication timing between an external vehicle diagnostic apparatus and two ECUs in the prior art apparatus.

The communication control processing will now be described referring to FIG. 3 and FIG. 4. FIG. 3 is a flowchart showing communication procedures. FIG. 4 is a timing chart showing the communication timing of the diagnostic apparatus 20, the ECU 11 and 12.

The flowchart in FIG. 3 shows a combination of the programs executed by the diagnostic apparatus 20 and the ECUs 11 and 12, for convenience of description. Referring to FIG. 4, the top line shows a signal waveform sent by the diagnostic apparatus 20 to the serial data bus 14, the middle line shows a signal waveform sent by the ECU 11 to the serial data bus 14, and the bottom line shows a signal waveform sent by the ECU 12 to the serial data bus 14.

In this example, communication is occurring among the diagnostic apparatus 20, the first ECU 11 and the second ECU 12, and the diagnostic apparatus 20 functions as a master ECU, and each ECU 11, 12 functions as a slave ECU.

As FIG. 3 shows, the diagnostic apparatus 20 sends a general request signal to the serial data bus 14 at Step 201. The request signal includes, for example a three byte message header and eight byte message data. The message header includes data indicating the kind of the signal (request signal in this case), data indicating the destination of the signal (ECU 11, 12 in this case), and data indicating the sender of the signal (diagnostic apparatus 20 in this case). The message data includes data forming the substantive contents of the request to the ECU 11 and 12.

At Step 202, each ECU 11, 12 judges whether its predetermined idle time P2 has passed (0 msec<P2<50 msec). In this example, the idle time P2 of the ECU 11 is shorter than the idle time P2 of the ECU 12. When the judgment at Step 202 is NO, each ECU waits until its idle time P2 has elapsed. When the judgment at Step 202 is YES, that is, when the idle time P2 of either ECU 11 or 12 has passed, the ECU 11 or 12 judges whether it is ready to send a positive response signal to the diagnostic apparatus 20 at Step 203.

When not ready to send the positive response signal, the ECU 11 or 12 sends a special negative response signal to the diagnostic apparatus 20 at Step 204. This special signal identifies the ECU that sends it to the diagnostic apparatus 20.

The special negative response signal of Step 204 is different from that in the prior art apparatus. That is, when one of the ECUs (ECU 11 for example) cannot respond within a response time (or when the corresponding P2 has elapsed), the ECU 11 sends the special negative response signal, which allows the other ECU (ECU 12 in this case) to respond to the diagnostic apparatus 20. This solves the problem in the prior art apparatus of preventing the other ECU from responding to a diagnostic apparatus when one ECU sends a negative response signal to the diagnostic apparatus.

The above special negative response signal includes, for example a three byte message header and eight byte message data. The message header includes data indicating the kind of the signal (negative response signal in this case), data indicating the destination of the signal (diagnostic apparatus 20 in this case), and data indicating the sender of the signal (ECU 11 or 12 in this case). The message data includes data forming the substantive concrete contents of the response to the diagnostic apparatus 20. One byte portion of the message data is a special response code. The special response code requests the diagnostic apparatus 20 to send a request signal again. The diagnostic apparatus 20, which has received the special negative response signal, permits responses from ECUs other than the ECU that sent the special negative response signal.

When ready to send a positive response signal to the diagnostic apparatus 20 at Step 203, the ECU 11 or 12 sends the positive response signal to the apparatus 20 at Step 205. The response signal also has, for example, a three byte message header and eight byte message data as in the above negative response signal. The message header is the same as that in the negative response signal. The message data includes data forming the substantive contents of the response to the diagnostic apparatus 20, such as information to indicate malfunctions.

At Step 206, the diagnostic apparatus 20 judges whether the other ECU has failed to respond to the request. If the ECU 11 sent the special negative response signal at Step 204, the diagnostic apparatus 20 judges whether the other ECU 12 has failed to respond to the request signal. Likewise, if the ECU 11 sent a positive response signal at Step 205, the diagnostic apparatus 20 judges whether the other ECU has failed to respond to the request signal. If the other ECU has not yet responded to the request signal, the ongoing program goes back to Step 202 and repeats Steps 202 through 206. If the other ECU 12 has responded to the request signal, the program goes on to Step 207. Thus, if there are multiple ECUs, the program does not proceed to Step 207 until all ECUs have responded.

At Step 207, the diagnostic apparatus 20 judges whether the special negative response signal has been received from the ECU 11 or 12. When no special negative response signal has been received, the diagnostic apparatus 20 judges that each ECU has completed its response to the request signal and ends the communication program. If the special negative response signal was received by the diagnostic apparatus, the program goes on to Step 208.

At Step 208, the diagnostic apparatus 20 sends a second, or specific request signal to each ECU that sent the special negative response signal. However, the second request signal is different from the general request signal at Step 201. The second request signal at Step 208 is "one to one" communication, while the general request signal at Step 201 is "one to Plural N" communication. In other words, if the ECU 11 sent the special negative response signal at Step 204, at Step 208, the diagnostic apparatus 20 sends the second request signal directed only to the ECU 11 based on the special response code in the one byte portion of the special negative response signal.

At Step 209, the ECU that sent the negative response signal judges again whether the corresponding idle time P2 as elapsed (0 msec <P2<50 msec). When the judgment at Step 209 is NO, the ECU waits until the idle time P2 has elapsed. When the judgment at Step 209 is YES, that is, when the idle time has elapsed, the ECU judges whether it is ready to send a positive response signal to the diagnostic apparatus 20 at Step 210.

If the ECU is not ready to send a positive response signal at Step 210, the ECU sends a negative response signal to the diagnostic apparatus 20 at Step 211.

On the other hand, if the ECU is ready to send a positive response signal at Step 210, the ECU sends a positive response signal to the diagnostic apparatus 20 at Step 212 and ends the communication program for the present.

The functions and advantages of the present embodiment are the following.

In the vehicle communication control apparatus shown in FIG. 1, one ECU, ECU 11 for example, sends a special negative response signal to the diagnostic apparatus 20 when unable to respond to a request signal from the diagnostic apparatus 20. The special negative response signal permits the other ECU 12 to respond to the request signal sent by the diagnostic apparatus 20.

After receiving the special negative response signal from the ECU 11, the diagnostic apparatus 20 receives a response signal from the other ECU 12 and then sends a request signal to the ECU 11 alone (one-to-one communication). In this way, the other ECU 12 is able to respond if the ECU 11 is unable to respond within a response time (or when P2 has elapsed). This prevents degradation of the communication and accomplishes smooth communication.

It should be apparent to those skilled in the art that the present invention may be embodied in many other specific forms without departing from the spirit or scope of the invention. Particularly, it should be understood that the invention may be embodied in the following forms.

In the embodiment of FIG. 1, only the ECU 11 has a communication control program and functions as a master ECU that controls signals on the serial data bus 14. However, the ECU 12 may also function as a master ECU in addition to the ECU 11.

At least one of the ECUs that form the network must function as a master ECU. Plural ECUs may function as master ECUs. In other control processes, there may be a need to have plural ECUs function as master ECUs.

In the embodiment of FIG. 1, the ECU 11 controls external devices 37 such as a fuel injector and also controls the communication. It is also possible to have an ECU that works exclusively for the communication control processing. In this case, the adjustment to changes of communication standards is easy and prompt.

In the embodiment of FIG. 1, two ECUs 11 and 12 are connected by the serial data bus 14. More than two ECUs may also be connected to the serial data bus 14.

Therefore, the present examples and embodiments are to be considered as illustrative and not restrictive and the invention is not to be limited to the details given herein, but may be modified within the scope and equivalence of the appended claims.

What is claimed is:

1. A communication control apparatus for controlling communication between a plurality of electronic control units provided in a vehicle and a diagnostic device, wherein the diagnostic device diagnoses each of set of electronic control units, the apparatus comprising:

a determiner in each control unit that determines whether a positive response can be issued to the diagnostic device within a predetermined response time after receiving a first request signal from the diagnostic device; and a transmitter in each control unit of the set that transmits a negative response signal including a message header indicating a negative response to the diagnostic device when the determiner determines that a positive response to the diagnostic device cannot be issued, wherein the negative response signal allows another control unit of the set to respond to the diagnostic device and generates a second request signal from the diagnostic device to retrieve each control unit operation previously by-passed.

2. The communication control apparatus according to claim 1, wherein the diagnostic device sends the second request signal directed to a negatively responding control unit after all the control units in the set have responded to the request.

3. The communication control apparatus according to claim 2, wherein each of the control units stores diagnostic data used for diagnosis and is connected to the other control units to construct a communication network, wherein the diagnostic device is connected to the network to communicate with and read out the diagnostic data stored in each of the control units.

4. A communication control apparatus for controlling communication between a diagnostic device and a set of electronic control units including a first ECU and a second ECU over a network, the apparatus comprising:

a general requestor in the diagnostic device the issues a general request signal to the set of ECUs via the network;

a determiner in each of the first and second ECUs that determines readiness to respond to the general request signal within a predetermined period of time from receipt of the request signal from the network;

a transmitter in each control unit of the set that transmits a response signal, including a message header indicating that the response signal is either negative or positive, to the diagnostic device via the network when the associated determiner determines unreadiness or readiness, respectively, wherein a negative response signal from the first ECU does not prevent the second ECU from responding to the diagnostic device via the network, and wherein the negative response signal generates a specific request signal from the diagnostic device to retrieve each control unit operation previously by-passed.

5. The apparatus according to claim 4 further comprising:

a one-to-one transmitter in the diagnostic device that sends the specific request signal over the network directed specifically to a negatively responding ECU; and an identifier in the diagnostic device that permits the diagnostic device to identify which, if any, ECU has responded negatively.

6. The apparatus according to claim 5, wherein the diagnostic device sends the specific request signal only if all control units in the set have responded to the general request signal and if a negative response signal has been issued by a control unit and received by the diagnostic device.

7. A method for controlling communication between a plurality of electronic control units provided in a vehicle and a diagnostic device, wherein the diagnostic device diagnoses each of a set of electronic control units, the method comprising:

determining whether each control unit is able to respond positively to the diagnostic device within a predetermined response time after receiving a first request signal from the diagnostic device; and transmitting a negative response signal including a message header indicating a negative response to the diagnostic device from each control unit of the set that is not ready to positively respond to the diagnostic device, wherein the negative response signal allows another control unit of the set to respond to the diagnostic device, and wherein the negative response signal generates a second request signal from the diagnostic device to retrieve each control unit operation previously by-passed.

8. The method according to claim 7 further comprising sending the second request signal directed to a negatively responding control unit from the diagnostic device after the diagnostic device has received a response from all the control units of the set if the diagnostic device receives a negative response signal.

* * * * *